Figure 1:
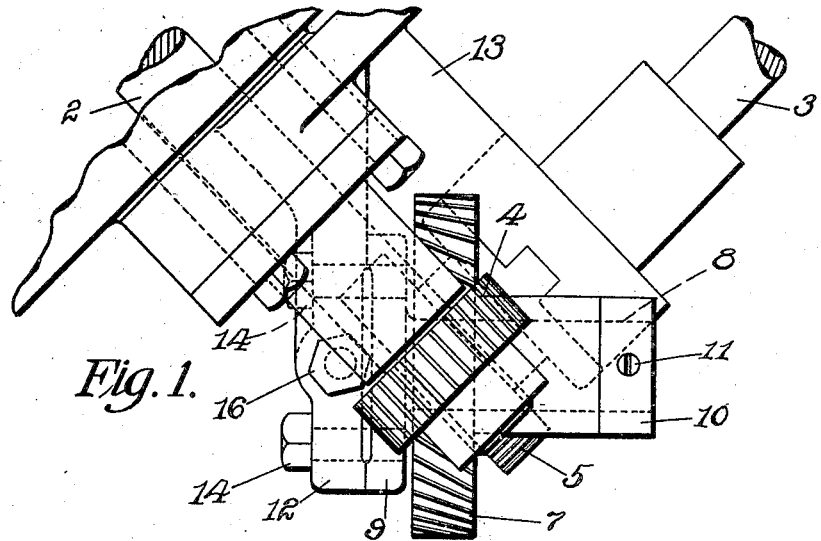

R. S. CURLEY.
ANGULAR DRIVING MECHANISM.
APPLICATION FILED AUG. 7, 1920.

1,397,244.

Patented Nov. 15, 1921.

Inventor.
Robert S. Curley
by J. H. McCurdy
his Atty.

UNITED STATES PATENT OFFICE.

ROBERT S. CURLEY, OF LOWELL, MASSACHUSETTS, ASSIGNOR TO SACO-LOWELL SHOPS, OF BOSTON, MASSACHUSETTS, A CORPORATION OF MASSACHUSETTS.

ANGULAR DRIVING MECHANISM.

1,397,244.  Specification of Letters Patent.  Patented Nov. 15, 1921.

Application filed August 7, 1920. Serial No. 401,906.

*To all whom it may concern:*

Be it known that I, ROBERT S. CURLEY, a citizen of the United States, residing at Lowell, in the county of Middlesex and State of Massachusetts, have invented certain Improvements in Angular Driving Mechanisms, of which the following description, in connection with the accompanying drawings, is a specification, like reference characters on the drawings indicating like parts in the several figures.

It is very frequently necessary in machinery to drive one shaft from another extending at an angle thereto, the most common relationship being that in which the two shafts lie at right angles to each other. Frequently, also, it is desirable to provide such a driving mechanism with means for varying the driving ratio between the two shafts. It has been the usual practice heretofore to use either bevel gears or spiral gears for these requirements, but bevel gears are open to the objection of being noisy, while spiral gears, although quiet in operation, are relatively expensive to manufacture. While the driving ratio can be changed in mechanisms of this type by changing the gears used, it is the usual practice, where change speed effects are desired, to use, in addition to the bevel or spiral gears, a series of spur gears so mounted that they can be changed to obtain the desired driving ratios. This construction is employed for the reason that spur gears can be manufactured more economically than the bevel or spiral gears.

It is the chief object of the present invention to devise an angular driving mechanism which will be simple in construction, quiet in operation, and relatively inexpensive to manufacture. It is also an object of the invention to devise a mechanism having these advantages and in which the driving ratio can conveniently be changed.

The nature of the invention will be readily understood from the following description when read in connection with the accompanying drawings, and the novel features will be pointed out in the appended claims.

Figure 2:
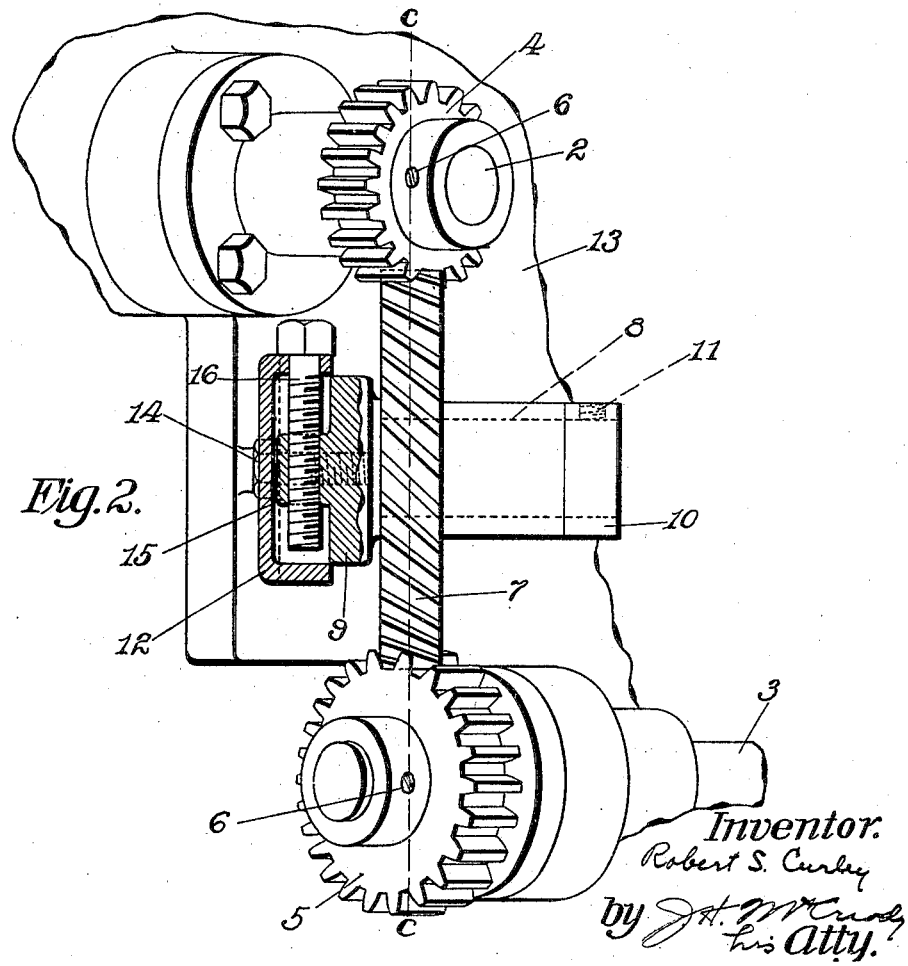

Referring now to the drawings,

Figure 1 is a plan view of a mechanism embodying the invention in the form at present preferred; and Fig. 2 is a front elevation, partly in vertical cross section, of the mechanism shown in Fig. 1, The invention as herein disclosed is embodied in a right angle drive designed particularly to operate the evener mechanism in a cotton picking machine, although it will be evident that the same mechanism could be used for other purposes, and that a mechanism having the essential features of that shown but differing therefrom in minor details of construction is applicable to a great variety of uses.

The construction shown comprises two shafts designated at 2 and 3, respectively, each mounted in suitable bearings for rotation about a fixed axis. Either shaft may be used as the driving shaft and one shaft is mounted above and at right angles to the other. A spur gear 4 is mounted fast on the upper shaft 2 and another spur gear 5 likewise is secured fast on the lower shaft 3. These gears may be secured to their respective shafts by set screws 6 or in any other convenient manner. The securing means, however, should be such that the spur gears can readily be removed and replaced by gears of a different size.

The spur gears 4 and 5 are operatively connected by a spiral gear 7 which is rotatably mounted on a stub shaft 8 projecting from, or formed integral with, a bracket 9. A collar 10 secured on this shaft by a set screw 11 holds the gear 7 on the shaft. Since the spur gears 4 and 5 rotate about axes at right angles to each other, the teeth of the spiral gear 7 are cut at an angle of 45° to the plane of its axis of rotation, and this axis also makes an angle of 45° with the axes of the shafts 2 and 3. All of these axes lie in parallel planes.

It will be seen from an inspection of the drawings that the planes of rotation of the three gears intersect in a common straight line C—C, Fig. 2, which line is intersected by the axes of rotation of the gears, and that when the gears 4 and 5 are changed to change the ratio of the drive between the shafts 2 and 3 it is necessary, if the same spiral gear 7 is to be used, to adjust this gear in the vertical line C—C. For this purpose the bracket 9 is adjustably secured by bolts 14—14 to the face of a projection 12 extending from the machine frame 13. These bolts project through vertical slots formed in the part 12. A vertical slot or groove also is formed in the part 12 to receive a lug 15 extending from the bracket 9 and a screw 16 threaded through this lug and extending through a hole in the part 12 provides a convenient means for effecting this vertical adjustment. In the operation of this mechanism either shaft 2 or 3 may be used as the driving shaft, and the driving force is transmitted from one spur gear through the spiral gear 7 to the opposite spur gear and thence to the driven shaft. This invention thus provides a very simple form of angular drive which is relatively economical to manufacture and which, due to the presence of the spiral gear, operates very quietly.

Whenever it is desired to change the driving ratio, the spur gears 4 and 5 are removed and replaced by other gears of the proper size to give the desired ratio, the spiral gear 7 being adjusted vertically as may be required to mesh with the new spur gears. Since these spur gears can be manufactured relatively economically a great variety of changes in ratio can be provided for at a comparatively small expense.

What is claimed as new is:

1. A driving mechanism of the character described, comprising, in combination, a pair of spur gears, a spiral gear connecting said spur gears, and supporting means for all of said gears.

2. A driving mechanism of the character described, comprising, in combination, a pair of spur gears, shafts supporting said gears, a spiral gear connecting said spur gears, and supporting means for said spiral gear enabling it to be adjusted relatively to said shafts.

3. A driving mechanism of the character described, comprising, in combination, a driving shaft, a driven shaft extending at an angle to said driving shaft, a spur gear on each shaft, and a spiral gear connecting said spur gears, the planes of rotation of said gears intersecting in a common straight line.

4. A driving mechanism of the character described, comprising, in combination, a driving shaft, a driven shaft extending at an angle to said driving shaft, a spur gear on each shaft, a spiral gear connecting said spur gears, and a shaft supporting said spiral gear, the axes of rotation of said gears lying in parallel planes.

5. A driving mechanism of the character described, comprising, in combination, a driving shaft, a driven shaft extending at an angle to said driving shaft, a spur gear on each shaft, a spiral gear connecting said spur gears, the planes of rotation of said gears intersecting in a common straight line, and means supporting said spiral gear for adjustment in said line.

6. A driving mechanism of the character described, comprising, in combination, a driving shaft, a driven shaft extending at right angles to said driving shaft, a spur gear mounted on each of said shafts, a 45° spiral gear connecting said spur gears, and a shaft rotatably supporting said spiral gear.

7. A driving mechanism of the character described, comprising, in combination, a driving shaft, a driven shaft extending at an angle to said driving shaft, a spur gear removably mounted on each of said shafts, a spiral gear connecting said spur gears, a shaft rotatably supporting said spiral gear, and means supporting the last mentioned shaft for adjustment relatively to said driving and driven shafts.

In testimony whereof I have signed my name to this specification.

ROBERT S. CURLEY.